INVENTOR
HENRY P. C. KEULS

United States Patent Office 3,621,834
Patented Nov. 23, 1971

3,621,834
AIR PURIFIER AND HUMIDIFIER
Henry P. C. Keuls, 205 E. 63rd St.,
New York, N.Y. 10021
Continuation-in-part of application Ser. No. 685,034,
Nov. 22, 1967. This application July 23, 1969,
Ser. No. 843,986
The portion of the term of the patent subsequent to
Sept. 2, 1986, has been disclaimed
Int. Cl. B01d 45/10
U.S. Cl. 55—234    4 Claims

ABSTRACT OF THE DISCLOSURE

A window-mounted air purifier and humidifier comprising a housing having an inlet for external air covered by an insect excluding, non-dirt-filtering screen and an air outlet covered by an air filter. Incoming air impinges upon an air scrubber or wick mounted in a liquid reservoir and generation of proper air flow paths are facilitated by a depending vane directed toward the wick.

BACKGROUND

This application is a continuation-in-part of my copending prior application, Ser. No. 685,034, filed Nov. 22, 1967, now U.S. Pat. 3,464,188.

This invention relates to air purifiers and, more particularly, to window-mounted air purifiers which additionally can humidify the incoming air.

In large cities and industrial areas the air is heavily laden with dust and dirt which is harmful to health as well as being unpleasant because of the deposits of dirt inside of homes, office buildings, hospitals, etc., caused by air circulation from the outside. Furthermore, in most areas air carries pollen to which many people are allergic. Consequently, there is a great need for an inexpensive air purifier which removes the dust, dirt and pollen from the air as the air enters the inside of a building. It is well known to place filter elements across the open portion of a window in order to trap this foreign matter; however, these filter elements rapidly become clogged and prevent adequate air flow into buildings. Furthermore, when heavy winds are present it is common for the dirt trapped on and in the filter elements to be blown into the room, thus defeating the purpose for using the filter elements. Another problem with such elements is that it is necessary to remove them in the wintertime, thus leaving the air unfiltered when fresh air is desired.

Another problem existing in many buildings today, especially those buildings heated by hot air systems, is the dryness during the heating season which is unhealthy, uncomfortable and harmful to furniture.

Accordingly, it is one object of this invention to provide an improved, inexpensive air filter to be mounted in an opened window which effectively purifies the air.

It is another object of this invention to provide an improved, inexpensive air purifier which can be permanently mounted in an open window, which effectively purifies air without becoming clogged and without limiting the flow of air into the room, which humidifies the incoming air, and which performs its foresaid functions without requiring any moving parts.

BRIEF SUMMARY OF INVENTION

Briefly stated, this invention, in one form, comprises an elongated housing having a top wall, a bottom wall, a front wall and two end walls and being opened at the rear portion thereof to receive external air. The top wall is provided with an air outlet having a removable filter element mounted thereacross. A screen having mesh apertures appropriate to exclude insects, but large enough to prevent the screen from serving as a filtering element is mounted across the inlet for external air.

Located within the housing at a position spaced from the rear screen is a liquid reservoir. Supported within each reservoir is a plurality of air scrubbers or wicks which absorb liquid from the reservoir and provide a large, moist and rough surface against which the incoming air impinges. Each wick is supported within the reservoir to slope in a direction toward the air inlet or, in other words, the wick slopes generally from the bottom wall upwardly toward the rearward portion. Depending from the top wall of the housing is an air flow guide means or vane which directs the air entering the housing at a level above the wicks toward the wicks to ensure passage of all incoming air across the front or rear surface of the wicks.

Air entering the air purifier through the non-filtering screen impinges against the wet wicks whereupon the air and dirt particles become moisture laden. The dirt particles adhere to the wicks or, due to the turbulent flow of air produced in the housing, fall into the reservoir. The purified air then enters the room through the air filtering means mounted across the air outlet which serves to remove any dirt particles or large water droplets not previously removed.

DESCRIPTION OF THE DRAWINGS

The above objectives and attendant advantages as well as others will become apparent from the description below and the drawing in which.

PREFERRED EMBODIMENT

Figure 1:
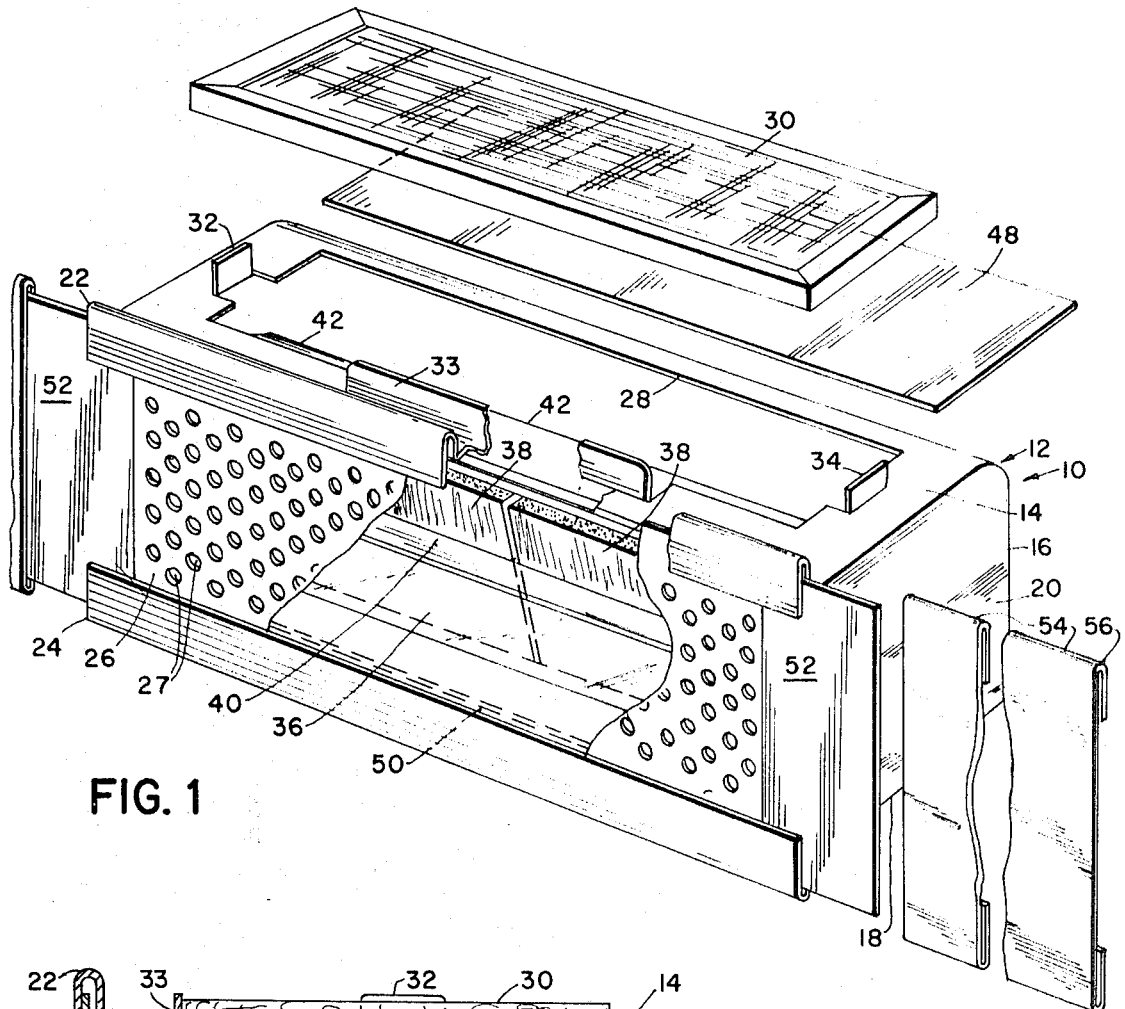
FIG. 1 is a partially exploded, perspective view of an air purifier formed in accordance with this invention

With reference to the drawing, there is illustrated an air purifier and humidifier 10 (above and hereinafter referred to as a purifier) of the type adapted to be mounted in an opened window (not shown). The purifier comprises a housing 12 which can be of metal or plastic formed with a top wall 14, front wall 16, bottom wall 18 and end walls 20, only one of which is shown. The rearwardmost portion of the top wall 14 and bottom wall 18 are provided with U-shaped channels, 22, 24, respectively, facing inwardly toward one another (see FIG. 2). Supported within the channels 22, 24 is a screen 26 having a mesh aperture size appropriate for the exclusion of insects, but which is large enough to prevent the screen 26 from serving as a filter element for the removal of dirt particles.

If desired, screen 26 may be fastened in place, desirably to the exterior of the channels 22, 24.

The screen can be of the conventional woven mesh type or it can be a plate having apertures 27 of any shape, circular apertures being illustrated in FIG. 1. A suitable mesh size has been found to be provided by circular perforations having a diameter of $5/32''$ on $3/16''$ staggered centers. The rear portion of the housing is intended to be directly exposed to the exterior of the building in order to communicate directly with the external air. The screen provides air inlet passages 27 which effectively prevent insects and other animals, such as rodents and birds, from entering the house without also serving as a filtering element. In other words, the dirt is essentially "invited" into the housing in order to prevent the air inlet from becoming clogged with dirt particles and restricting the flow of incoming air.

An air outlet 28 is provided through the top wall 14 of the housing 12. A conventional air filter 30 is removably mounted on the top wall 14 to cover the air outlet 28. One means for mounting the filter 30 is to fabricate it larger than the air outlet 28 and have it rest upon the top wall 14. In order to limit sliding of the filter the top wall is lanced and the portions which are lanced are folded upwardly as shown at three locations 32, 33, 34. These lanced portions form abutments against which the filter element 30 rests to prevent dislodgment of the filter element during normal use and to facilitate easy removal of the filter element for cleaning replacing.

Supported within the housing 12 is an elongated reservoir 36 which rests upon the bottom wall 18. One or more air scrubbers or wicks 38 are removably supported in the reservoir 36 and extend from the bottom upwardly to a point above the upper surface of the reservoir thereof. The wicks are very absorbent and provide a large, moist, rough surface area. One material that has been found suitable for this use is a material sold commercially under the name "Vapoglas" by Skuttle Manufacturing Co., Milford, Mich.

Preferably, screen 26 is of a length corresponding substantially to the length of the reservoir 36. In this manner, the incoming air entering through inlet passages 27 will not pass around the ends of reservoir 36 without having first been compelled to pass through and undergo the filtering action of the wicks 38.

The wicks 38 are supported by an easel-shaped bracket 40 having a sloped surface against which the wicks lie. The bracket is designed to orient the wicks in a direction toward the air inlet or, in other words, the bracket supports the wicks so that the wicks form an obtuse angle with the portion of the bottom wall 18 between the wicks and the front wall 16. Sloping of the wick is intended to provide a desirable air flow pattern through the housing 12 in order to ensure maximum contact of the air with the front and rear surfaces of the wick.

Suspended from the top wall 14 is an air flow guide means or vane 42 which extends downwardly toward the wicks 38 but which stops short of the wicks in order to readily permit flow of air past the wicks 38 and the vane 42. The vane is oriented to form an acute angle with the portion of the top wall 14 between the vane 42 and the front wall 16.

Figure 2:
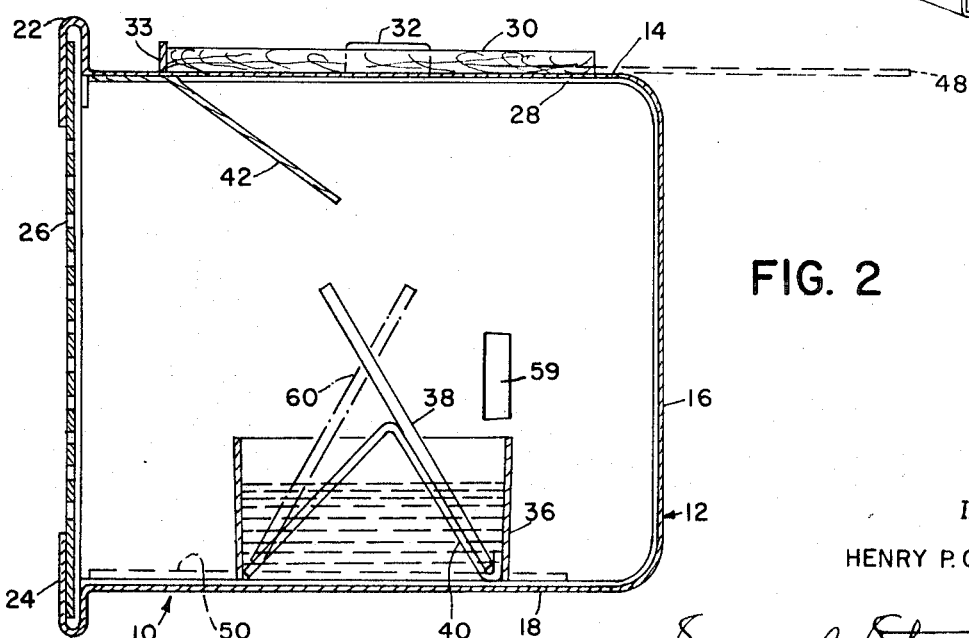
FIG. 2 is an end cross-sectional view of the air purifier of FIG. 1.

A manually operable obturation device or door 48 is provided to partially or totally obturate the air outlet 28 in order to restrict the flow of air into the room. One simple and effective means for readily utilizing the door 48 is to insert it under the removable filter element 30 thus requiring no additional structure while permitting easy use and access of the door 48. FIG. 2 illustrates the door 48 in a position partially closing the outlet 28 (see dotted lines).

The door 48 and the air filter 30 are desirably formed as a single unit, arranged so that the panel constituting door 48 has limited sliding movement transversely thereof, thereby to control the amount and the velocity of the filtered air entering the room or other space served by the purifier and humidifier.

The top wall 14 of the housing is desirably provided along the longitudinal and/or transverse edges of air outlet 28 with suitable closure fasteners to hold the air filter 30 in place against upward displacement thereof by air entering the room through the purifier and humidifier at an excessive velocity.

An alternate, but less convenient method for terminating the air flow is to obturate the air inlet. A door 50, shown with phantom lines in FIG. 2, is hinged to the bottom wall 18. It rests upon the bottom wall when not in use and is swung up to obturate the inlet when so desired.

The reservoir 36 is easily filled by merely removing the filter element 30 which will then provide direct access from the top of the housing 14 to the reservoir 36. Water then can be poured into the reservoir and the wicks can be removed and cleaned if necessary. In addition to purifying and humidifying the air, the purifier 10 can serve to disinfect the air or provide a pleasant fragrance to the air merely by adding a disinfectant or perfume to the water in the reservoir 36.

The purifier 10 is made adjustable in order to fit various sized windows. This is accomplished by providing a pair of extension panels 52, 54 at each end of the rear portion of the housing. The first panel 52 is flat and is received by the channels 22, 24. The second panel 54 is folded over to form channels 56, 58 at its top and bottom, which channels receive the first panel 52 in sliding fashion. When the purifier is inserted in the open window the panels 52, 54 are extended sufficiently to close the portion of the window not blocked by the purifier housing 12.

The channels 56, 58 may desirably each be provided with gaskets along the inner surface thereof.

For use in colder climates, having in mind that the combined air purifier and humidifier hereof is used as a window-mounted unit, any suitable removable means, such as an electrically heated plate or other heating unit 59, may be inserted or installed in the housing to prevent freezing of the water in reservoir 36. Such a heating unit may be utilized as aforesaid, in lieu of or in conjunction with the use of any of the commercially available high boiling anti-freeze liquids, such as those marketed under the trademarks "Prestone," "Zerex," etc. The combined use of a heating unit as described, and an anti-freeze liquid, will serve to protect the liquid in reservoir 36 from freezing in the event the anti-freeze liquid is not present in an adequate concentration.

Desirably, a suitably sized opening, say of 1½ inch diameter, is formed adjacent the front wall 16 or in the end walls 20, adjacent the upper ends thereof, or in the top wall 14 itself, to provide access for water or antifreeze liquid to be furnished to the reservoir 36. The opening may be provided with any suitable type closure. Such opening will serve also to enable sighting and inspection of the contents of reservoir 36.

OPERATION OF PURIFIER

Air entering the air inlet through the lower portion thereof will flow inwardly toward the wicks 38 and impinge thereupon. The air entering near the top of the air inlet is guided by the vane 42 toward the wicks 38 such that some of the air will impinge upon the surface of the wicks 38 facing the air inlet while other air will pass behind the wicks, i.e., on the forward side of the wicks. Some of the air will flow over the forward surface of the wicks while the remainder of the air hits the front wall 16, reverses direction and impinges upon the surface of the wicks facing the front wall 16. The flow of air leaving the wicks in a direction toward the outlet 28 and the air leaving the vane 42 intersects and causes turbulent flow within the housing resulting in sufficient interface of the air with the wicks to effectively remove a great proportion of the dust, dirt and pollen carried by the incoming air. Furthermore, the moisture on the wicks also humidifies the air. The air then escapes through the filter element covering the air outlet 28 whereby any remaining foreign particles and excess moisture are removed.

The door 48 closes the purifier sufficiently to prevent air from entering the room. This allows the unit to remain in the window during all seasons and provides means for controlling the quantity of air entering the room.

It will be seen from the drawing and from the description herein that one of the important advantages of the air purifier and humidifier hereof is that it operates entirely without moving parts, and may readily be installed for operation in a window or the like by unskilled labor. Moreover, since it utilizes no moving parts, no electricity or other source of power is required for its operation.

SECOND EMBODIMENT

As a second embodiment of this invention the wicks can be oriented away from the air inlet as shown by the phantom lines 60 in FIG. 2 such that the wicks form an acute angle with the portion of the bottom wall 18 between the wicks and the front wall 16. Planes passing through the wicks 60 and the vane 42 form a line of intersection at a position spaced forwardly from the wicks or at a distance from the air inlet greater than the furthest distance between the wick and the air inlet. This wick arrangement will also provide sufficient turbulence to ensure impingement of the air against the wicks.

While certain preferred embodiments of this invention have been described above for purposes of illustration, it is to be understood that various changes and modifications can be made therein without departing from the spirit and scope of this invention as defined in the following claims.

What I claim is:

1. An air purifier adapted to be mounted in an open window, comprising:
   (a) a housing having a front wall, a top wall, a bottom wall, two end walls and being open at its rear;
   (b) an insect screen mounted across the rear of the housing, the screen having an aperture size appropriate for excluding insects but too large to filter dust, dirt, and pollen from the air;
   (c) an air outlet through the top wall of the housing and exposed to the interior of the room in the window of which the purifier is mounted;
   (d) an air filter removably mounted across the outlet;
   (e) a container supported on the bottom wall of the housing and extending substantially the full length of the housing, said container including a body of liquid;
   (f) an upwardly extending wick disposed within the container and in contact with the liquid therein, the wick being disposed in said container in a position to enable air entering the housing through the open rear thereof to impinge upon the wick and thereby be deprived of dust, dirt and pollen by the liquid, and to be reflected off the wick for flow toward said outlet;
   (g) means for supporting the wick in the container;
   (h) a vane depending from the top wall of the housing adjacent the rear thereof and extending downwardly toward the wick, the vane forming an acute angle with the portion of the top wall which lies between the vane and the front wall, the lower edge of the vane being spaced from the upper edge of the wick; and
   (i) said screen being fastened to the open rear of the housing along each longitudinal margin of the screen, and a longitudinally adjustable extension panel mounted at each end of the rear of the housing for adjustably closing the space between said end walls and the sides of the window in which the purifier is mounted, said screen being of a length which does not substantially exceed the longitudinal dimension of said container, whereby substantially no air entering the housing through said open rear can pass around the ends of said container without passing through and being subjected to the action of the wick disposed within the container.

2. An air purifier as defined in claim 1, wherein said top wall is provided with an air obturating panel, said panel being slidable transversely of said top wall, said panel having limited sliding movement relative to said filter, whereby to control the amount and velocity of filtered air entering the room.

3. An air purifier as defined in claim 1, wherein said top wall is provided with means for preventing or reducing substantial upward displacement of said filter by air entering the room through said filter at a volume or velocity sufficient to cause such upward displacement of said filter in the absence of said means.

4. An air purifier as defined in claim 1 and having a removable heating unit arranged therein to prevent freezing of the liquid in said container at temperatures below the normal freezing point thereof.

References Cited
UNITED STATES PATENTS

| | | | |
|---|---|---|---|
| 458,538 | 8/1891 | Olsen | 55—234 |
| 1,451,329 | 4/1923 | Dressler | 261—99 |
| 1,916,907 | 7/1933 | Sargent | 261—99 |
| 1,918,531 | 7/1933 | Gentry | 55—234 |
| 2,638,644 | 5/1953 | Rauhut | 55—234 |
| 3,464,188 | 9/1969 | Keuls | 55—482 |

FRANK W. LUTTER, Primary Examiner

B. NOZICK, Assistant Examiner

U.S. Cl. X.R.

55—267, 417; 261—107